May 7, 1968     E. F. KLESSIG ET AL     3,381,585

MULTIPOSITION SERVO CONTROL MECHANISM

Filed July 11, 1966     4 Sheets-Sheet 1

INVENTORS.
ERNST F. KLESSIG
ROGER O. GRIFFITHS
KENNETH C. MAHAFFY

BY *Hofgren, Wegner, Allen, Stellman & McCord.*

ATTORNEYS.

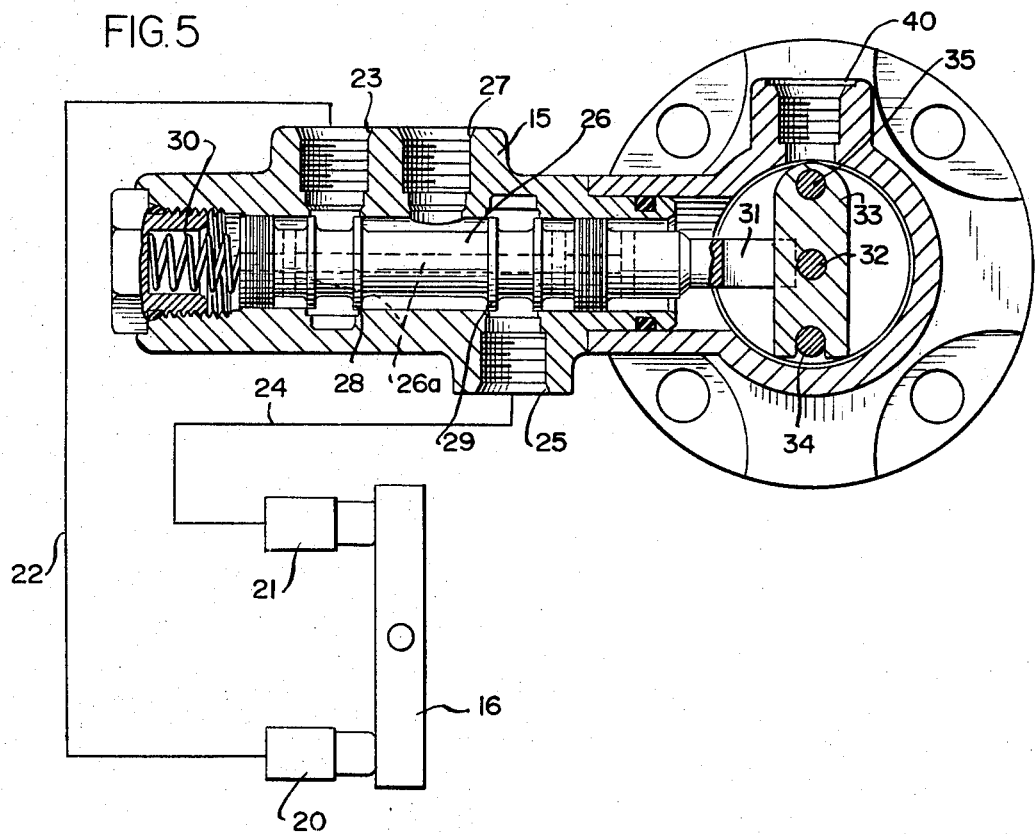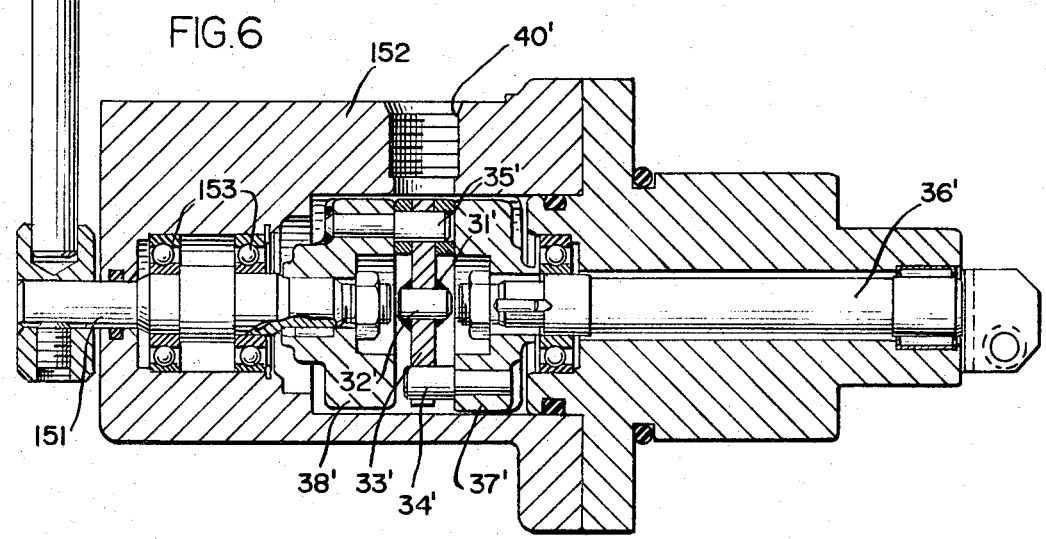

United States Patent Office 3,381,585
Patented May 7, 1968

3,381,585
MULTIPOSITION SERVO CONTROL
MECHANISM
Ernst F. Klessig, Roger O. Griffiths, and Kenneth C.
Mahaffy, Racine, Wis., assignors to Racine Hydraulics & Machinery, Inc., a corporation of Wisconsin
Filed July 11, 1966, Ser. No. 564,163
15 Claims. (Cl. 91—178)

ABSTRACT OF THE DISCLOSURE

A multiposition servo control mechanism in which a control valve for positioning a member is controlled by a rock shaft operating a lever with the shaft having a plurality of different rotative positions established by control pistons with an adjustable null position and a feedback signal is also supplied to said lever to modify the action of the control valve.

This invention relates to a servo control mechanism and, more particularly, to such a mechanism providing for both manual and powered positioning of a positionable member for a device such as a pump or motor.

An object of this invention is to provide a new and improved servo control for a positionable member, such as a control member of a fluid pump or motor having a variety of positions to control the output of the pump or motor.

Another object of the invention is to provide a servo control of the type defined above wherein a fluid operated multiposition actuator is associated with the servo control for determining the position of the member and with the actuator adapted for remote operation.

Still another object of the invention is to provide a multiposition fluid actuator for a servo control in which anyone of of a number of pre-selected positions can be otained and with there being an additional null position effective when no other control position is selected and with the null position also being adjustable to become an additional control position.

Further objects and advantages will become apparent from the following detailed description taken in connection with the accompanying drawings in which:

FIG. 5 is a vertical section, taken generally along the line 5—5 in FIG. 2; and

FIG. 6 is a view similar to FIG. 2 of another embodiment of the invention, omitting the fluid operated multiposition actuator.

Figure 1:
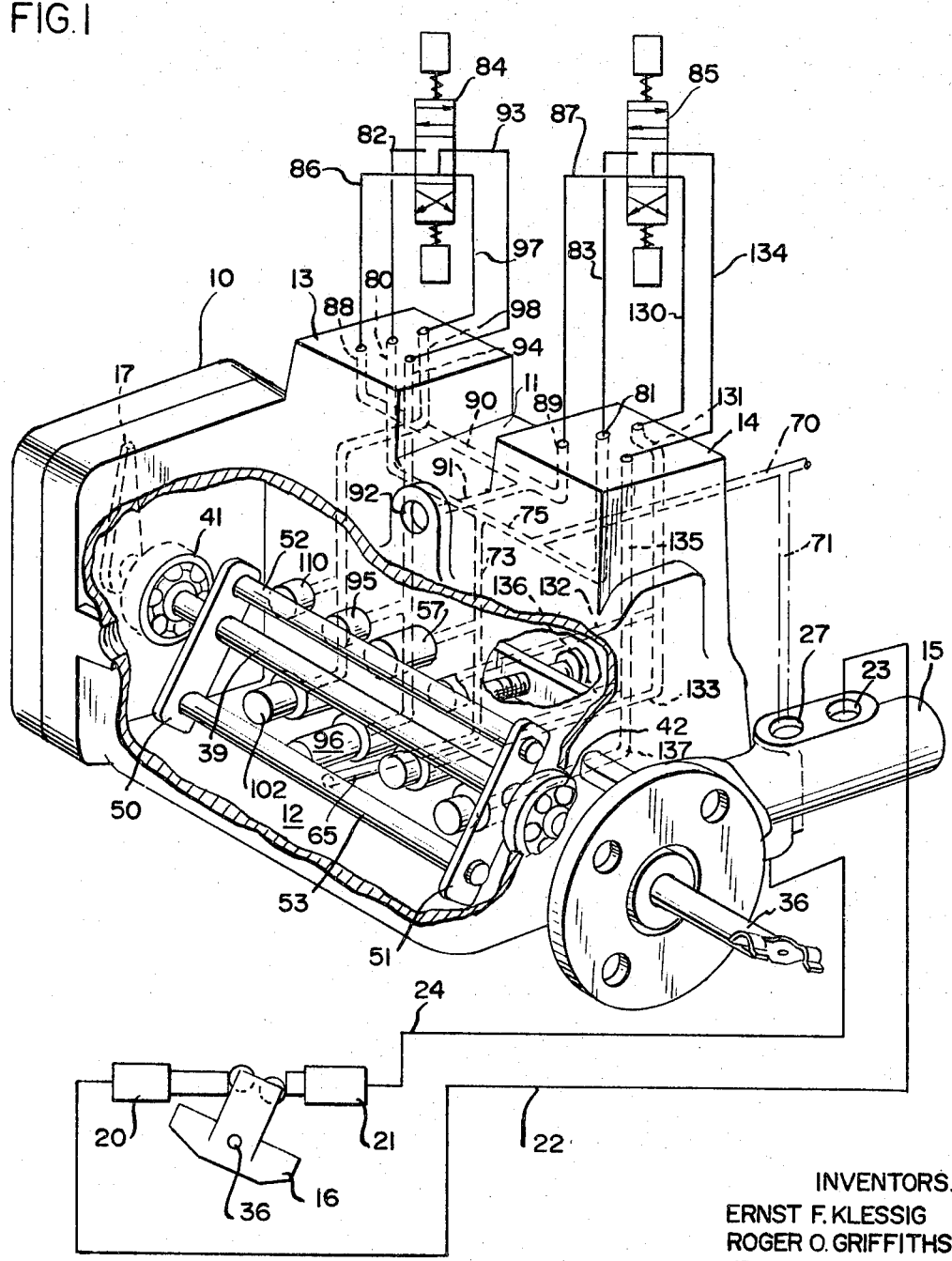
FIG. 1 is a perspective view of the multiposition actuator and servo control of the preferred embodiment shown in association with tha positionable member of a pump or motor and having control circuitry associated therewith and with parts broken away.

While this invention is susceptible of embodiment in many different forms, there is shown in the drawings and will herein be described in detail an embodiment of the invention, together with a modification thereof, with the understanding that the present disclosure is to be considered as an exemplification of the principles of the invention and is not intended to limit the invention to the embodiments illustrated. The scope of the invention will be pointed out in the appended claims.

First referring to the preferred embodiment, the overall construction is shown in FIG. 1, in which a casing 10 has a central body section 11 formed with a series of drilled fluid passages to be described, with an interior chamber 12 extending lengthwise adjacent the solid body section 11. The body section 11 has a pair of upper, flat sections 13 and 14 for making a number of fluid line connections to be described subsequently.

The actuator and servo mechanism results in operation of a valve positioned in a housing 15 (FIGS. 1 and 5) which controls a positionable member 16, such as the swash plate of a fluid pump or motor. A pointer 17 (FIGS. 1 and 2) can be used to indicate the position of the swash plate.

The positioning of the member 16 is, as an example, hydraulically controlled by selective operation of one or the other of a pair of hydraulic pistons and cylinders 20 and 21 (FIG. 5) urging the member 16 in opposite directions about a pivot. The piston 20 is connected by a line 22 to an outlet port 23 in the valve casing 15 while the piston 21 is connected by a line 24 to an outlet port 25 in the valve casing. The casing has a valve member 26 slidably mounted in the bore thereof having a neutral no-flow position in which fluid entering through a port 27 is blocked from communication with either of the outlet ports 23 and 25 by the flanges 28 and 29 on the valve stem. The valve stem is urged to the right, as viewed in FIG. 5, by a spring 30 engaging against an end of the stem and the control position of the valve member is determined by the engagement of a forked end 31 of the valve stem engaging opposite ends of a pin 32 mounted centrally in a lever 33 forming part of the servo mechanism. As the pin 32 shifts position either toward or away from the valve casing 15, movement of the valve stem 26 will result in a corresponding direction either as urged by the spring 30 or against the spring to connect either of the ports 23 and 25 to inlet pressure. Exhaust flow from a cylinder 20 or 21 passes to valve 15 and through internal passages 26a in valve member 26 to an outlet port 40 to tank. Depending upon the direction of shift of the valve, the movement of the positionable member 16 will result to vary the operation of the pump or motor.

The servo mechanism functions to restore the operating valve to a central no flow condition to maintain the established control position of the member 16. The initial movement of the valve member 26 results from pivoting of the lever 33 about a pivot pin 34, as caused by a rotative actuating force exerted on a pivot pin 35 by the fluid operated multiposition actuator to be described. Assuming the pin 35 is moved in a clockwise direction, as viewed in FIG. 5, about the pivot pin 34, which is stationary, this will result in movement of the valve stem 26 to the right, under the urging of spring 30 to connect pressure fluid to outlet port 25 which, through line 24, actuates piston 21 to shift the positionable member 16 about its pivot. In order to restore steady state conditions, the pivot pin 34 is connected for movement to a shaft 36 which rotates with the positionable member 16 and feeds back a signal representing the position of the member 16. This feedback movement will move pivot pin 34 about pivot pin 35 to shift the valve stem 26 gradually back to a neutral no flow position when the control position has been reached. The pivot pin 34 giving the feed-back signal rotates about the axis of shaft 36 and is connected thereto by a sleeve 37 fixed to the shaft 36 and having an annular flange which defines an arm carrying the pivot pin 34. The pivot pin 35 delivering the input signal into the lever 33 is carried by an arm in the form of a sleeve 38 and rotates about the axis of a shaft 39 to which the sleeve 38 is attached. The space in which the lever 33 is located is provided with an outlet port 40 for connection to tank.

Figure 2:
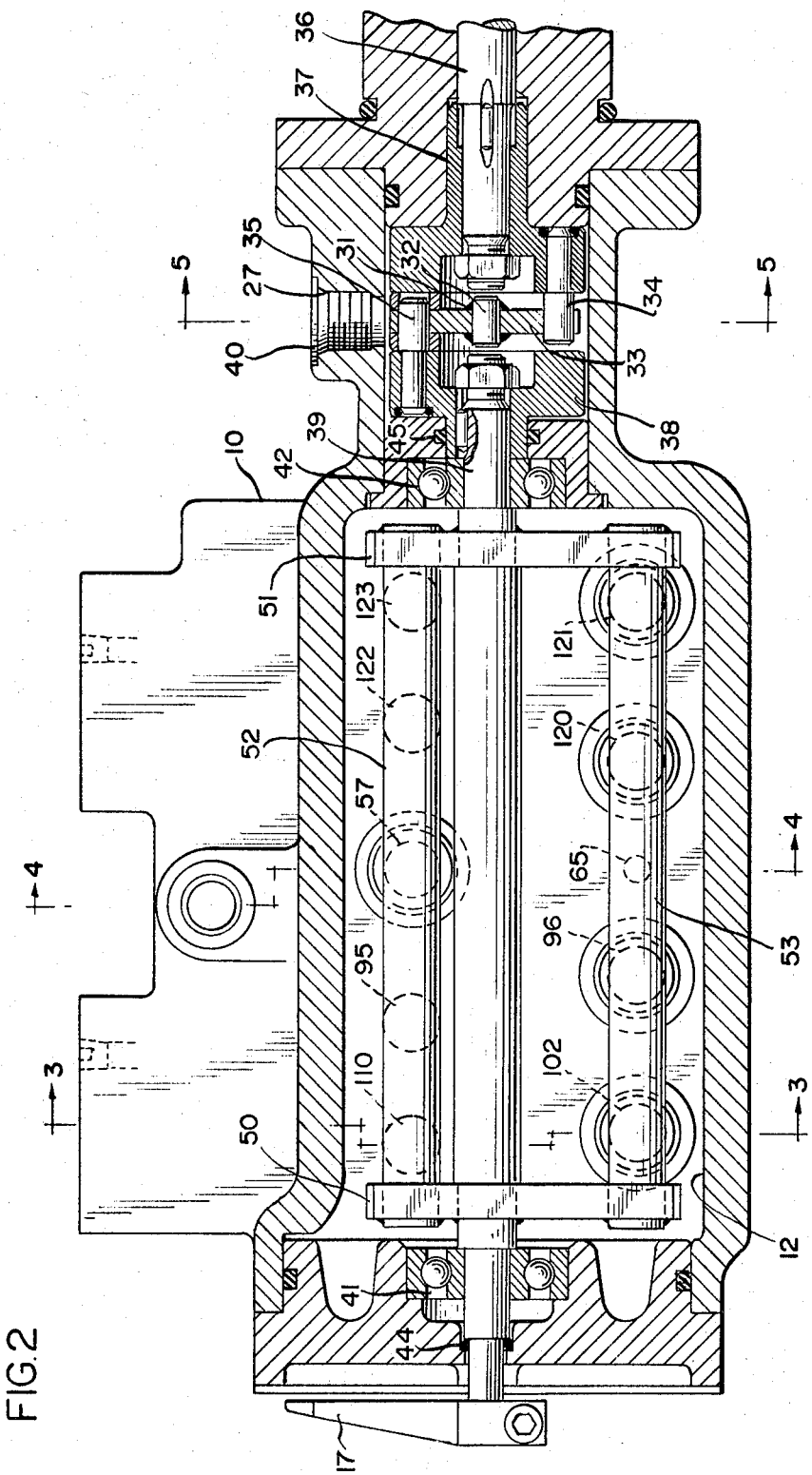
FIG. 2 is a vertical section taken through the rockable shaft of the actuator and generally along the line 2—2 in FIG. 3.

The input shaft 39 has the pointer 17 directly mounted to an opposite end thereof extending outside the casing 10, as shown in FIG. 2.

As shown in FIGS. 1 and 2, the shaft 39 is rotatably supported by bearings 41 and 42 mounted in the casing 10. The shaft 39 extends through the chamber 12, with this chamber having a port 43 connectible to tank and with the shaft 39 having O-ring seals 44 and 45, as shown in FIG. 2, to seal off the ends of the shaft extending beyond the chamber 12.

The fluid operated multiposition actuator provides for a plurality of adjustable control positions, with an automatic fluid control for establishing an adjustable null position which can also be an added control position. The control positions can, if desired, all be at one side of the null position.

The central section of the shaft 39 forms part of a member rockable about the axis of shaft 39 and engageable by control rods and rams to obtain the rocking movement. This member has a pair of spaced apart arms 50 and 51 extending unequal distances from the shaft 39 and having a pair of bars 52 and 53 extending therebetween. The bar 53 is positioned at a distance from the shaft 39 approximately twice the distance of the bar 52, with the result that equal amounts of force applied to both of the bars will result in approximately a 2:1 ratio of torque applied to the shaft 39.

Figure 4:
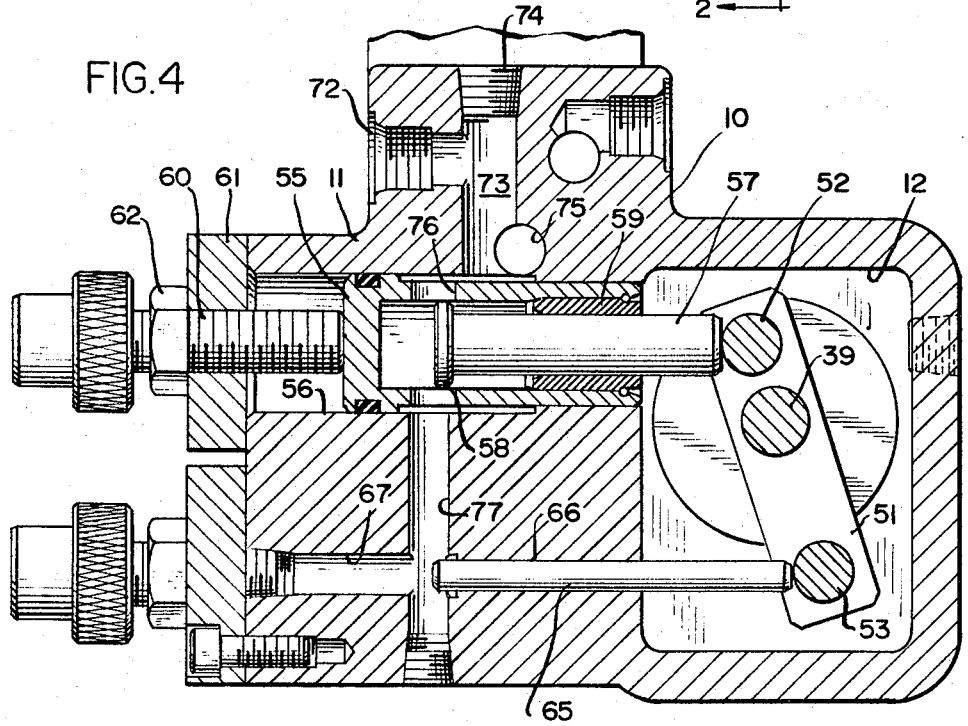
FIG. 4 is a vertical section, taken generally along the line 4—4 in FIG. 2.

Referring particularly to the null positioning mechanism, shown in FIGS. 1, 2 and 4, there is provided a cylinder 55 positionable in a bore 56 in the body section 11 and having a ram 57 therein engageable with the bar 52 of the rockable member. The ram 57 has a piston 58 engageable with a sleeve 59 mounted in the cylinder 55, as shown in FIG. 4, to limit the extent to which the ram extends from the cylinder. This limit is established by the construction of the parts. However, the position of the cylinder 55, itself, in the bore 56 can be adjusted by an adjusting bolt 60 threaded in a back wall 61 of the casing and which abuts against an end of the cylinder 55. Once the location of the bolt is established by rotation of the bolt 60, the bolt can be locked in position by a lock nut 62. The cylinder maintains this position because unequal forces act on the cylinder and the greater force urges it toward the bolt 60.

A second ram 65 is positioned in a bore 66 and can move back into an enlarged bore 67 and acts in opposition to the first ram 57. The first ram 57 engages against the bar 52, while the second ram 65 engages against the bar 53. When the system is operational, fluid pressure at all times is applied against the two rams 57 and 65 and, as shown, the ram 57 has a cross-sectional area approximately four times that of ram 65, while ram 65 is operating on a moment arm approximately twice that of ram 57, with the net result that approximately twice as much torque is applied by ram 57 to overcome ram 65 and urge the shaft 39 in a clockwise direction, as viewed in FIG. 4. As subsequently described, actuation of any of the other fluid controls will result in overcoming this force to rock the shaft 39 in either clockwise or counterclockwise directions. The cylinder 55 can be adjusted to provide a positive null setting or suitably adjusted to some other position to provide an added control position for the positionable member 16 of the pump or motor by contact of head 58 with sleeve 59 carried by cylinder 55. When the ram 57 rocks the shaft 39, the ram 65 acts in opposition to prevent backlash in the operation of the mechanism.

The rams 57 and 65 are supplied with pressure fluid at all times when the system is operative through a line 70, as shown in FIG. 1, and having a branch 71 leading to the valve port 27 and connecting to a port 72 at the back of the casing (FIG. 4), which has a passage 73 capped at one end by a cap 74 and which extends downwardly to communicate with a drilled passage 75 extending lengthwise of the casing. The passage 73, as shown in FIG. 4, communicates with the cylinder bore 56 and with the interior of the cylinder 55 through passages 76 formed in the wall of the cylinder, with a further passage 77 extending downwardly to intersect the bores 66 and 67 in which the ram 65 is movable. There are no control valves in the circuit leading to the rams 57 and 65, so that when pressure fluid is supplied to line 70, the rams 57 and 65 will function with the ram 57 resulting in movement of the shaft 39 in either a clockwise or counterclockwise direction to a limit position. Any backlash is eliminated by the movement being opposed by ram 65, which is also subjected to fluid pressure.

Figure 3:
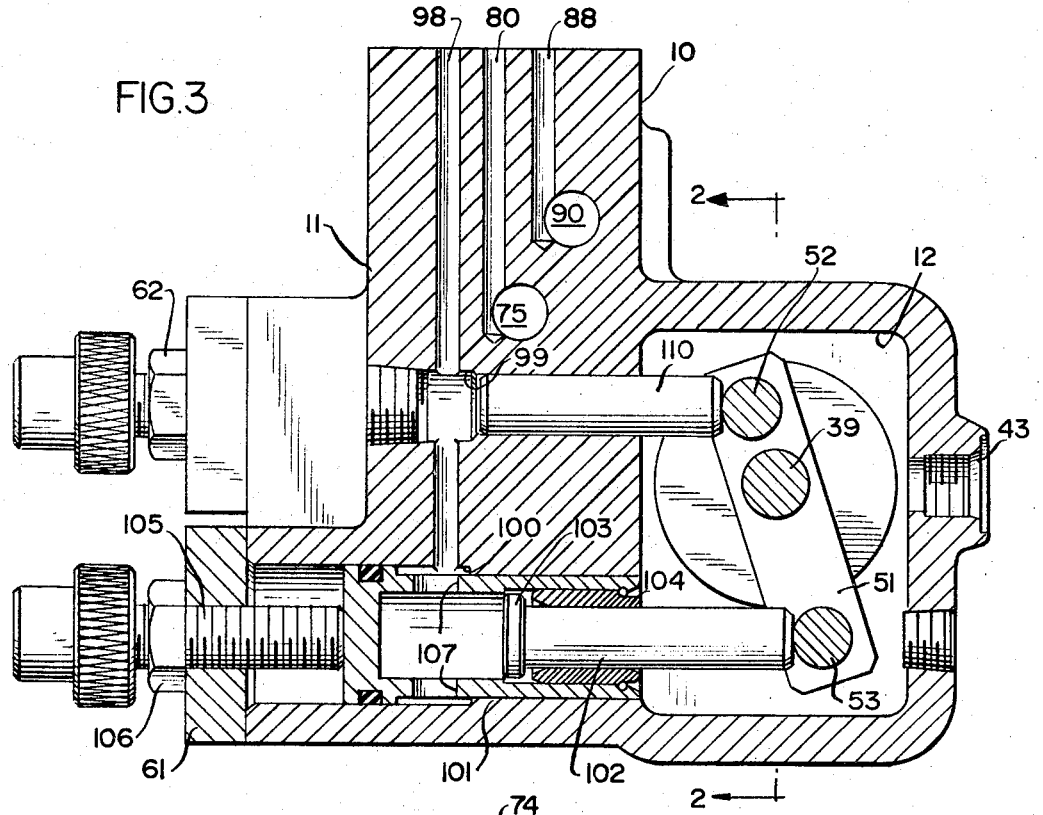
FIG. 3 is a vertical section, taken generally along the line 3—3 in FIG. 2.

The pressure fluid passage 75 terminates in upward passages 80 and 81 which, by lines 82 and 83, respectively, connect into double solenoid operated valves 84 and 85, respectively. The valves 84 and 85 connect to tank lines 86 and 87, respectively, which connect with passages 88 and 89 in the valve body 10 which, through internal passages 90 and 91, connect to a tank port 92 (FIG. 1). The operation of each of the valves 84 and 85 is similar, with each of the valves establishing two different control positions. Referring to valve 84 when it is shifted in one direction, pressure fluid is passed to a line 93 which leads to a passage 94 in the casing which supplies control members 95 and 96. When the valve 84 is shifted in the opposite direction, pressure is supplied through a line 97 to a passage 98 which is shown more particularly in FIG. 3. The passage 98 extends downwardly to intersect two bores 99 and 100, with a cylinder 101 mounted in bore 100 and having a rod 102 with a head 103 movable therein similarly to the cylinder 55 and ram 57, previously described and shown in FIG. 4. The rod 102 acts against the bar 53 of the rockable member when pressure fluid is directed through passage 98 to the bore 100. The extent to which the rod 102 travels, or its limit position, is determined by engagement against a sleeve 104 positioned in the cylinder and with the location of the cylinder being determined by a bolt 105 threaded in the casing wall 61 and held in adjusted position by a lock nut 106. The cylinder has ports 107 in the wall thereof to place the interior of the cylinder in fluid communication with the passage 98.

A second rod 110 is positioned in the bore 99 and has its left-hand end positioned for exertion of fluid pressure thereagainst to push the rod 110 outwardly of the bore and against the bar 52 of the rockable member. With the head 103 of the rod 102 being hydraulically balanced, the rods 102 and 110 have the same effective area whereby the rod 102 acts through a distance twice as large as that through which the rod 110 acts relative to the pivot axis of shaft 39 to exert twice the amount of torque. The torque exerted by rod 102 not only exceeds that of rod 110 but also exceeds the summation of the torque exerted by ram 65 and the ram 57 of the null position control shown in FIG. 4, with the result that any time that the control rod at any control station is actuated this will result in rotation of the rockable member in either direction about the axis of shaft 39, with the rod 110 acting to eliminate lacklash. The control elements 95 and 96 are of the same construction as those described in connection with FIG. 3 with there being two additional control stations having similar control rods 120 and 121 and associated control rods 122 and 123 acting in association with bar 52.

The control rods 120 and 122 are controlled by valve 85 through a line 130 and an internal passage 131 with branch passages 132 and 133 with the control rods 121 and 123 also controlled by the valve 85 through a line 134 and an internal passage 135 with branch passages 136 and 137.

With the construction as described herein, the positionable member 16 can be in one of several different control positions by operation of one of the control stations of the multi-position actuator. In the event that no predetermined control is established by shift of either of valves 84 and 85, the null position control embodying rams 57 and 65, shown in FIG. 4, will be effective to establish the null position unless the cylinder 55 has otherwise been located to establish a control position. When either of the valves 84 or 85 are actuated, depending upon the actuation, a certain control station will be energized to overcome the null position control and rock the member and shaft 39 to a position to reposition the positionable member 16. This position is maintained until the control mechanism is changed. Both the null position and the other control positions can all be independently adjusted to provide a wide variety of control positions.

Another embodiment of the invention is shown in FIG. 6 in which the multi-position fluid operated actuator is not provided and wherein the servo mechanism can only be operated by a handle. This handle is shown at 150 connected to a shaft 151 rotatably mounted in a casing 152 by bearings 153. This construction in other respects is generally similar to that shown in FIGS. 1 to 5 and similar parts have been given the same reference numeral with a prime affixed thereto.

In both embodiments of the invention, a simple servo mechanism is provided which can control the position of a member for a pump or motor, while in the preferred embodiment a fluid operated multiposition actuator can be provided for remote control operation.

We claim:

1. A servo control for a positionable member comprising, an operator for the member, valve means for positioning the operator including a valve stem having a neutral no-flow position, a lever having means intermediate the ends thereof engageable by the valve stem, a pair of pivot connections for said lever at opposite ends thereof, and a pair of independent rotatable and coaxial mountings for said pivot connections with one of said mountings being positionable by input movement to the servo and the other positionable by the position of the positionable member.

2. A servo control as defined in claim 1 in which said pair of rotatable mountings each have a rotatably mounted shaft coaxial with said means engageable by the valve stem with a first arm on one shaft carrying one of said pivot connections and a second arm on the other shaft extending in a direction opposite to said first arm and carrying the other of said pivot connections whereby input movement rotates said one shaft and the first arm to pivot the lever about the pivot connection on the second arm resulting in movement of the valve stem and resulting movement of the positionable member rotates the other shaft and second arm about the pivot connection on the first arm to bring the valve stem back to neutral no-flow position.

3. A servo control as defined in claim 2 and a handle on said one shaft for imparting an input signal by manual rotation of said one shaft.

4. A servo control as defined in claim 2 and having a multiposition hydraulically operated actuator connected to said one shaft for imparting an input signal to the control.

5. A servo control as defined in claim 4 in which said actuator includes a plurality of selectively operable hydraulic pistons engageable with a member connected to said shaft in spaced parallel relation with each piston settable for a different throw to impart different degrees of movement to said shaft, and means for establishing an adjustable null position for said shaft when none of said plurality of pistons are operated.

6. A multiposition servo control for a power converter comprising, a movable member positionable to establish the signal to be supplied to the power converter, a plurality of fluid-operated actuators selectively operable and individually engageable with said member to obtain various positions of said member, and fluid power means continuously acting on said member in opposition to said actuators but with a lesser force than any one of said actuators whereby the member is in one position when none of said actuators are operated as caused by the power means and moves to one of said various positions when an actuator is operated and overcomes said fluid power means.

7. A servo control as defined in claim 6 in which said fluid power means includes adjustable structure to vary said one position of the movable member.

8. A multiposition actuator for a power converter such as a fluid pump or motor comprising, a member rockable about an axis to a plurality of positions to establish the signal to be applied to the power converter and having a null position, a plurality of independently energizable fluid operated actuators disposed in a line parallel and spaced from said axis and each having a rod engageable with said member to rock the member, means for independently adjusting the actuated position of said rods to control the positions of said member, and a fluid operated ram at the side of said axis opposite to said line of actuators urging said member to the null position, and means supplying fluid to said ram continuously, the torque applied to the member by any single actuator being greater than that applied by said ram whereby operation of any actuator will overcome the force of the ram and shift the member from the null position to one of said plurality of positions.

9. An actuator as defined in claim 8 including means for adjusting the limit position of the ram whereby the null positioning can become an additional control position for the power converter.

10. An actuator as defined in claim 8 in which the member has two spaced apart sections parallel to and on opposite sides of said axis with one section positioned to be engaged by said rods and the other section positioned to be engaged by said ram, said one section being at a greater distance from the axis than the other section, said ram exerting the same force as any one of said rods but the torque exerted on the member by the ram being less.

11. An actuator as defined in claim 10 wherein means are associated with the rods and ram acting on said member in opposition to said rods and ram to eliminate backlash in positioning of said member.

12. A remote multiposition control for a power converter such as a pump or motor comprising, a casing, a member mounted in said casing for rotatable adjustment about an axis for transmitting a signal to the power converter and having spaced parallel first and second sections at opposite sides of and at different distances from said axis, first means for establishing a first control position which can be a null position for the power converter including a first cylinder and ram therein engageable with the first member section and a second ram engageable with the second member section at a greater distance from the axis, the second ram being of a lesser area than the first ram whereby pressure applied against both rams results in greater torque exerted on the member through the first ram to shift the member to the first control position, and means for establishing a plurality of additional control positions with the means for each position comprising a second cylinder and a first rod therein engageable with the second member section and a second rod engageable with the first member section whereby pressure applied against both rods results in greater torque exerted on the member through the second member section to shift the member with the torque exceeding that exerted on the member by the first means.

13. A control as defined in claim 12 including means for adjusting the position of said cylinders to adjust the limit positions of said first ram and first rods to vary the control positions of said member.

14. A control as defined in claim 13 including a fluid control circuit with means for directing fluid under pressure continuously to said first and second rams.

15. A control as defined in claim 13 including an electrically operated valve for selectively applying fluid pressure to the first and second rods to shift the member to one of said additional control positions.

References Cited

UNITED STATES PATENTS

| | | | |
|---|---|---|---|
| 993,863 | 5/1911 | Moltrup | 92—73 |
| 1,004,016 | 9/1911 | Goodspeed | 92—129 |
| 1,866,347 | 7/1932 | Crocker | 92—129 |
| 2,131,481 | 9/1938 | O'Connor | 91—384 |
| 2,189,475 | 2/1940 | Saur | 91—384 |
| 2,615,432 | 10/1952 | Meddock | 91—384 |
| 2,886,948 | 5/1959 | Pomper | 91—384 |

MARTIN P. SCHWADRON, *Primary Examiner.*

P. E. MASLOUSKY, *Assistant Examiner.*